United States Patent
Kumar et al.

(10) Patent No.: US 12,386,670 B2
(45) Date of Patent: Aug. 12, 2025

(54) ON-DEMAND CLUSTERS IN CONTAINER COMPUTING ENVIRONMENT

(71) Applicant: Dell Products L.P., Round Rock, TX (US)

(72) Inventors: Dhilip S. Kumar, Bangalore (IN); Rohit Gosain, Bangalore (IN); Shibi Panikkar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 630 days.

(21) Appl. No.: 17/581,946

(22) Filed: Jan. 23, 2022

(65) Prior Publication Data
US 2023/0236897 A1    Jul. 27, 2023

(51) Int. Cl.
*G06F 9/50* (2006.01)
(52) U.S. Cl.
CPC ...... *G06F 9/505* (2013.01); *G06F 2209/5019* (2013.01)
(58) Field of Classification Search
CPC ....................................... G06F 9/505
See application file for complete search history.

(56) References Cited

U.S. PATENT DOCUMENTS

2022/0094690 A1\* 3/2022 Tarkhanyan ............ G06F 9/505

OTHER PUBLICATIONS

Pivotal Container Service, "Production-Ready Kubernetes for the Enterprise," https://pivotal.io/platform/pivotal-container-service, Accessed Mar. 4, 2020, 12 pages.
Vmware Enterprise PKS, "Deploy, Run and Manage Kubernetes for Production," https://cloud.vmware.com/vmware-enterprise-pks, Accessed Mar. 4, 2020, 11 pages.
The Linux Foundation, "What is Kubernetes?" https://kubernetes.io/docs/concepts/overview/what-is-kubernetes/, Oct. 22, 2020, 4 pages.
Kubernetes, "Horizontal Pod Autoscaler," https://kubernetes.io/docs/tasks/run-application/horizontal-pod-autoscale/, Jul. 26, 2021, 9 pages.
Github, "Vertical Pod Autoscaler," https://github.com/kubernetes/autoscaler/tree/master/vertical-pod-autoscaler, Accessed Aug. 19, 2021, 9 pages.

(Continued)

*Primary Examiner* — Charlie Sun
(74) *Attorney, Agent, or Firm* — Ryan, Mason & Lewis, LLP

(57) ABSTRACT

Techniques for managing containerized workloads in a container computing environment are disclosed. For example, a method comprises the following steps. In a first mode, the method learns resources and execution times needed to process incoming workloads of a first workload type and a second workload type in a set of one or more clusters in a container-based computing environment. In a second mode, based on the learning of resources and execution times in the first mode, the method determines whether a subsequent incoming workload of the second workload type can be executed by one of the set of one or more clusters or whether an additional cluster should be created to process the subsequent incoming workload and then removed after processing the subsequent incoming workload is completed.

20 Claims, 17 Drawing Sheets

(56) References Cited

OTHER PUBLICATIONS

Github, "kubernetes/autoscaler," https://github.com/kubernetes/autoscaler, Accessed Aug. 19, 2021, 3 pages.
Github, "Stork—Storage Operator Runtime for Kubernetes," https://github.com/libopenstorage/stork, accessed Feb. 4, 2021, 8 pages.
N. Yehia, "Kubernetes Self Remediation (AKA Poison Pill)," https://www.openshift.com/blog/kubernetes-self-remediation-aka-poison-pill, Nov. 18, 2020, 4 pages.
Github, "HPE CSI Driver for Kubernetes," https://github.com/hpe-storage/csi-driver, accessed Feb. 4, 2021, 3 pages.

* cited by examiner

| Cluster | Nodes | Number of PODS | Allocatable Resources | | |
|---|---|---|---|---|---|
| | | | CPU | Ephemeral-Storage | Memory |
| Cluster8 | 3 | 100 | 6900m | 56811701Ki | 2105mi |
| Cluster9 | 2 | 70 | 2800m | 32837430Ki | 1202mi |

```
name: Add an apt signing key for Kubernetes
  apt_key:
    url: <url>
    state: present

- name: Adding apt repository for Kubernetes
  apt_repository:
    repo: deb <Kubernetes.io URL>
    state: present
    filename: kubernetes.list

- name: Install Kubernetes binaries
  apt:
    name: "{{ packages }}"
    state: present
    update_cache: yes
  vars:
    packages:
      - kubelet
      - kubeadm
      - kubectl

- name: Configure node ip
  lineinfile:
    path: /etc/default/kubelet
    line: KUBELET_EXTRA_ARGS=--node-ip={{ node_ip }}

- name: Restart kubelet
  service:
    name: kubelet
    daemon_reload: yes
    state: restarted
```

```
name: Initialize the Kubernetes cluster using kubeadm
  command: kubeadm init --apiserver-advertise-
address="xxx.xxx.xx.xx" --apiserver-cert-extra-sans=" xxx.xxx.xx.xx"
--node-name k8s-master --pod-network-cidr=" xxx.xxx.xx.xx"
```
1210

FIG. 12C

```
name: Setup kubeconfig for vagrant user
  command: "{{ item }}"
  with_items:
    - mkdir -p /home/vagrant/.kube
    - cp -i /etc/kubernetes/admin.conf /home/vagrant/.kube/config
    - chown vagrant:vagrant /home/vagrant/.kube/config
```
1220

FIG. 12D

```
- name: Install calico pod network
  become: false
  command: kubectl create -f
https://docs.projectcalico.org/v3.4/getting-
started/kubernetes/installation/hosted/deploy.yaml
```
1230

FIG. 12E

```
name: Generate join command
  command: kubeadm token create --print-join-command
  register: join_command

- name: Copy join command to local file
  local_action: copy content="{{ join_command.stdout_lines[0] }}"
dest="./join-command"
```
1240

ON-DEMAND CLUSTERS IN CONTAINER COMPUTING ENVIRONMENT

FIELD

The field relates generally to information processing systems, and more particularly to containerized workload management in such information processing systems.

BACKGROUND

Information processing systems increasingly utilize reconfigurable virtual resources to meet changing user needs in an efficient, flexible and cost-effective manner. For example, cloud-based computing and storage systems implemented using virtual resources in the form of containers have been widely adopted. Such containers may be used to provide at least a portion of the virtualization infrastructure of a given information processing system. Further, container-based orchestration platforms such as, by way of example, Kubernetes, are now widely used as environments to test or develop application programs and/or models, especially in the area of artificial intelligence (AI). However, technical problems arise in managing such container environments.

SUMMARY

Illustrative embodiments provide techniques for managing containerized workloads in a container computing environment.

For example, in an illustrative embodiment, a method comprises the following steps. In a first mode, the method learns resources and execution times needed to process incoming workloads of a first workload type and a second workload type in a set of one or more clusters in a container-based computing environment. In a second mode, based on the learning of resources and execution times in the first mode, the method determines whether a subsequent incoming workload of the second workload type can be executed by one of the set of one or more clusters or whether an additional cluster should be created to process the subsequent incoming workload and then removed after processing the subsequent incoming workload is completed.

In further illustrative embodiments, the first workload type may be a regular execution workload and the second workload type may be a seasonal execution workload.

While such container management techniques are particularly effective in pod-based container environments, it is to be appreciated that the techniques can be implemented in other container environments.

These and other illustrative embodiments include, without limitation, apparatus, systems, methods and computer program products comprising processor-readable storage media.

BRIEF DESCRIPTION OF THE DRAWINGS

FIG. 11 illustrates allocated resource data recommended by an intelligent resource calculator according to an illustrative embodiment.

FIGS. 12A through 12E illustrate cluster set up commands for deploying a new cluster according to an illustrative embodiment.

DETAILED DESCRIPTION

Figure 1:
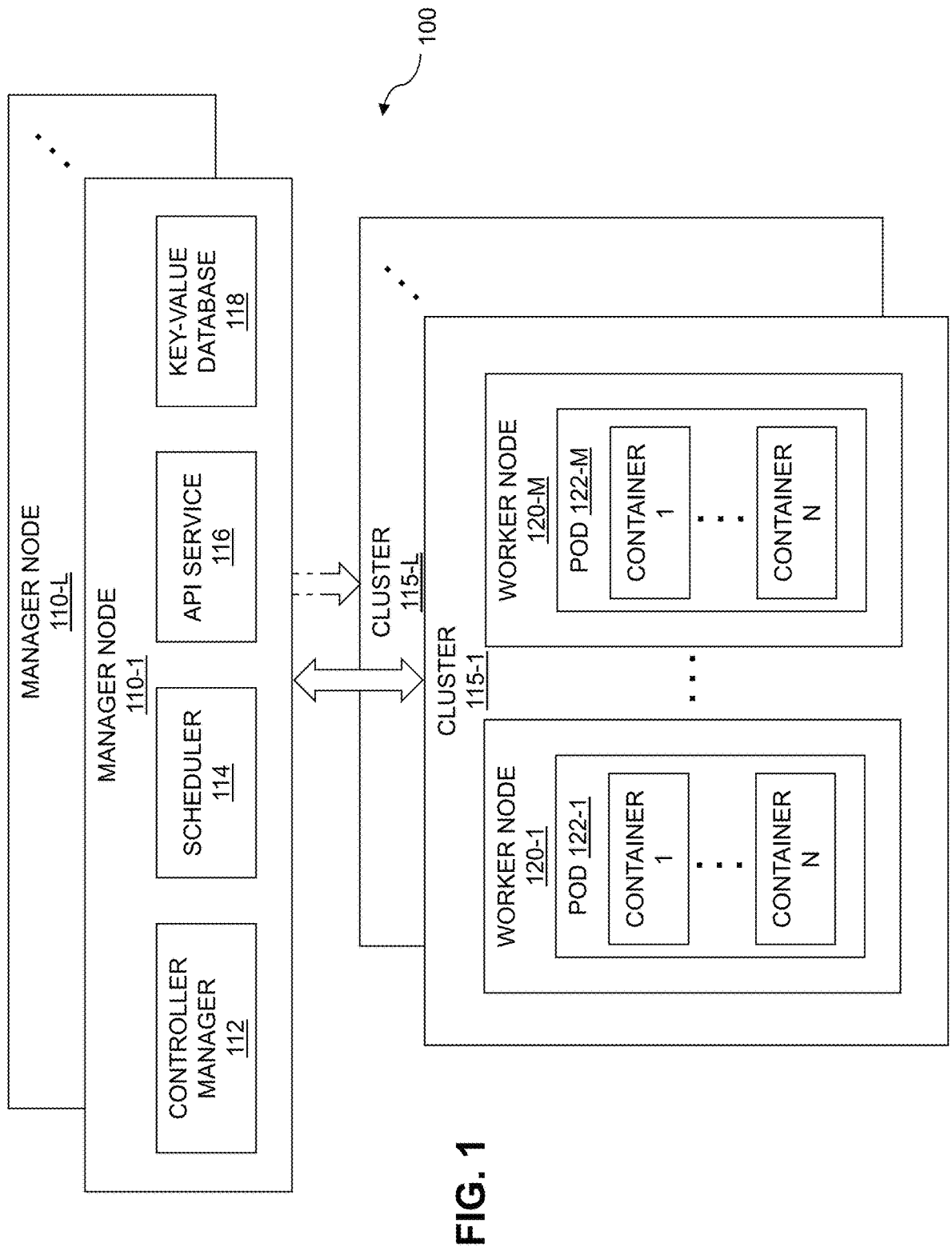
FIG. 1 illustrates a pod-based container environment within which one or more illustrative embodiments can be implemented.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing platforms comprising cloud and/or non-cloud computing and storage systems, as well as other types of processing systems comprising various combinations of physical and/or virtual processing resources. An information processing system may therefore comprise, by way of example only, at least one data center or other type of cloud-based system that includes one or more clouds hosting tenants that access cloud resources.

As the term is illustratively used herein, a container may be considered lightweight, stand-alone, executable software code that includes elements needed to run the software code. The container structure has many advantages including, but not limited to, isolating the software code from its surroundings, and helping reduce conflicts between different tenants or users running different software code on the same underlying infrastructure. The term "user" herein is intended to be broadly construed so as to encompass numerous arrangements of human, hardware, software or firmware entities, as well as combinations of such entities.

In illustrative embodiments, containers may be implemented using a Kubernetes container orchestration system. Kubernetes is an open-source system for automating application deployment, scaling, and management within a container-based information processing system comprised of components referred to as pods, nodes and clusters, as will be further explained below in the context of FIG. 1. Types of containers that may be implemented or otherwise adapted within the Kubernetes system include, but are not limited to, Docker containers or other types of Linux containers (LXCs) or Windows containers. Kubernetes has become the prevalent container orchestration system for managing containerized workloads. It is rapidly being adopted by many enterprise-based information technology (IT) organizations to deploy their application programs (applications). By way of example only, such applications may include stateless (or inherently redundant applications) and/or stateful applications. Non-limiting examples of stateful applications may include legacy databases such as Oracle, MySQL, and PostgreSQL, as well as other stateful applications that are not inherently redundant. While the Kubernetes container orchestration system is used to illustrate various embodiments, it is to be understood that alternative container orchestration systems can be utilized.

Some terminology associated with the Kubernetes container orchestration system will now be explained. In general, for a Kubernetes environment, one or more containers are part of a pod. Thus, the environment may be referred to, more generally, as a pod-based system, a pod-based container system, a pod-based container orchestration system, a pod-based container management system, or the like. As mentioned above, the containers can be any type of container, e.g., Docker container, etc. Furthermore, a pod is typically considered the smallest execution unit in the Kubernetes container orchestration environment. A pod encapsulates one or more containers. One or more pods are executed on a worker node. Multiple worker nodes form a cluster. A Kubernetes cluster is managed by a least one manager node. A Kubernetes environment may include multiple clusters respectively managed by multiple manager nodes. Furthermore, pods typically represent the respective processes running on a cluster. A pod may be configured as a single process wherein one or more containers execute one or more functions that operate together to implement the process. Pods may each have a unique Internet Protocol (IP) address enabling pods to communicate with one another, and for other system components to communicate with each pod. Still further, pods may each have persistent storage volumes associated therewith. Configuration information (configuration objects) indicating how a container executes can be specified for each pod.

FIG. 1 depicts an example of a pod-based container orchestration environment 100. As shown, a plurality of manager nodes 110-1, . . . 110-L (herein each individually referred to as manager node 110 or collectively as manager nodes 110) are respectively operatively coupled to a plurality of clusters 115-1, . . . 115-L (herein each individually referred to as cluster 115 or collectively as clusters 115). As mentioned above, each cluster is managed by at least one manager node. Illustrative embodiments provide for application copy management across multiple clusters (e.g., from one cluster of clusters 115 to another cluster of clusters 115), as will be further explained in detail herein.

Each cluster 115 comprises a plurality of worker nodes 120-1, . . . 120-M (herein each individually referred to as worker node 120 or collectively as worker nodes 120). Each worker node 120 comprises a respective pod, i.e., one of a plurality of pods 122-1, . . . 122-M (herein each individually referred to as pod 122 or collectively as pods 122). However, it is to be understood that one or more worker nodes 120 can run multiple pods 122 at a time. Each pod 122 comprises a set of containers 1, . . . N (each pod may also have a different number of containers). As used herein, a pod may be referred to more generally as a containerized workload. Also shown in FIG. 1, each manager node 110 comprises a controller manager 112, a scheduler 114, an application programming interface (API) service 116, and a key-value database 118, as will be further explained. However, in some embodiments, multiple manager nodes 110 may share one or more of the same controller manager 112, scheduler 114, API service 116, and key-value database 118.

Worker nodes 120 of each cluster 115 execute one or more applications associated with pods 122 (containerized workloads). Each manager node 110 manages the worker nodes 120, and therefore pods 122 and containers, in its corresponding cluster 115. More particularly, each manager node 110 controls operations in its corresponding cluster 115 utilizing the above-mentioned components, i.e., controller manager 112, scheduler 114, API service 116, and a key-value database 118. In general, controller manager 112 executes control processes (controllers) that are used to manage operations in cluster 115. Scheduler 114 typically schedules pods to run on particular nodes taking into account node resources and application execution requirements such as, but not limited to, deadlines. In general, in a Kubernetes implementation, API service 116 exposes the Kubernetes API, which is the front end of the Kubernetes container orchestration system. Key-value database 118 typically provides key-value storage for all cluster data including, but not limited to, configuration data objects generated, modified, deleted, and otherwise managed, during the course of system operations.

Figure 2:
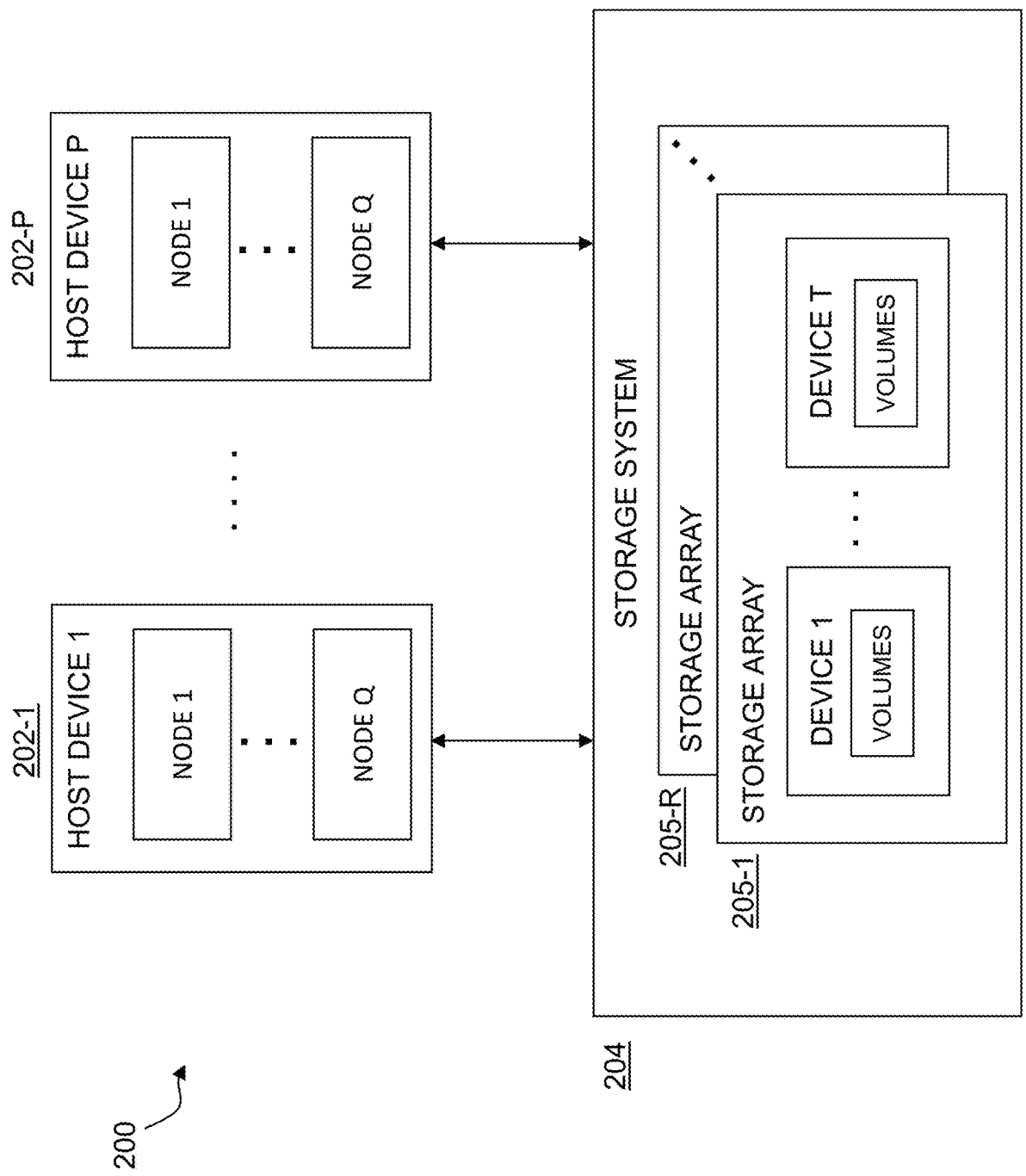
FIG. 2 illustrates host devices and a storage system within which one or more illustrative embodiments can be implemented.

Turning now to FIG. 2, an information processing system 200 is depicted within which pod-based container orchestration environment 100 of FIG. 1 can be implemented. More particularly, as shown in FIG. 2, a plurality of host devices 202-1, . . . 202-P (herein each individually referred to as host device 202 or collectively as host devices 202) are operatively coupled to a storage system 204. Each host device 202 hosts a set of nodes 1, . . . Q. Note that while multiple nodes are illustrated on each host device 202, a host device 202 can host a single node, and one or more host devices 202 can host a different number of nodes as compared with one or more other host devices 202.

As further shown in FIG. 2, storage system 204 comprises a plurality of storage arrays 205-1, . . . 205-R (herein each individually referred to as storage array 205 or collectively as storage arrays 205), each of which is comprised of a set of storage devices 1, . . . T upon which one or more storage volumes are persisted. The storage volumes depicted in the storage devices of each storage array 205 can include any data generated in the information processing system 200 but, more typically, include data generated, manipulated, or otherwise accessed, during the execution of one or more applications in the nodes of host devices 202.

Furthermore, any one of nodes 1, . . . Q on a given host device 202 can be a manager node 110 or a worker node 120 (FIG. 1). In some embodiments, a node can be configured as a manager node for one execution environment and as a worker node for another execution environment. Thus, the components of pod-based container orchestration environment 100 in FIG. 1 can be implemented on one or more of host devices 202, such that data associated with pods 122 (FIG. 1) running on the nodes 1, . . . Q is stored as persistent storage volumes in one or more of the storage devices 1, . . . T of one or more of storage arrays 205.

Host devices 202 and storage system 204 of information processing system 200 are assumed to be implemented using at least one processing platform comprising one or more processing devices each having a processor coupled to a memory. Such processing devices can illustratively include particular arrangements of compute, storage and network resources. In some alternative embodiments, one or more host devices 202 and storage system 204 can be implemented on respective distinct processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of information processing system 200 are possible, in which certain components of the system reside in one data center in a first geographic location while other components of the system reside in one or more other data centers in one or more other geographic locations that are potentially remote from the first geographic location. Thus, it is possible in some implementations of information processing system 200 for portions or components thereof to reside in different data centers. Numerous other distributed implementations of information processing system 200 are possible. Accordingly, the constituent parts of information processing system 200 can also be implemented in a distributed manner across multiple computing platforms.

Additional examples of processing platforms utilized to implement containers, container environments and container management systems in illustrative embodiments, such as those depicted in FIGS. 1 and 2, will be described in more detail below in conjunction with additional figures.

It is to be appreciated that these and other features of illustrative embodiments are presented by way of example only, and should not be construed as limiting in any way.

Accordingly, different numbers, types and arrangements of system components can be used in other embodiments. Although FIG. 2 shows an arrangement wherein host devices 202 are coupled to just one plurality of storage arrays 205, in other embodiments, host devices 202 may be coupled to and configured for operation with storage arrays across multiple storage systems similar to storage system 204.

It should be understood that the particular sets of components implemented in information processing system 200 as illustrated in FIG. 2 are presented by way of example only. In other embodiments, only subsets of these components, or additional or alternative sets of components, may be used, and such components may exhibit alternative functionality and configurations. Additional examples of systems implementing pod-based container management functionality will be described below.

Still further, information processing system 200 may be part of a public cloud infrastructure such as, but not limited to, Amazon Web Services (AWS), Google Cloud Platform (GCP), Microsoft Azure, etc. The cloud infrastructure may also include one or more private clouds and/or one or more hybrid clouds (e.g., a hybrid cloud is a combination of one or more private clouds and one or more public clouds).

As mentioned above, a Kubernetes pod may be referred to more generally herein as a containerized workload. One example of a containerized workload is an application program configured to provide a microservice. A microservice architecture is a software approach wherein a single application is composed of a plurality of loosely-coupled and independently-deployable smaller components or services. Container-based microservice architectures have profoundly changed the way development and operations teams test and deploy modern software. Containers help companies modernize by making it easier to scale and deploy applications. By way of example, Kubernetes helps developers and microservice operations teams because it manages the container orchestration well. The pod brings the container together and helps companies modernize by making it easier to scale and deploy applications. Kubernetes clusters allow containers to run across multiple machines and environments: virtual, physical, cloud-based, and on-premises. As shown and described above in the context of FIG. 1, Kubernetes clusters are comprised of one manager (master) node and multiple worker nodes. As explained, these nodes can either be physical computers or virtual machines, depending on the cluster.

Kubernetes clusters, pods, and containers have also introduced new technical problems as pods/containers are scaled with a cluster using a horizontal auto-scaler (HPA) functionality wherein the pod/containers are replicated within the cluster. However, pod/container scalability across Kubernetes clusters (cross-cluster scalability) is not available today.

Also, it is realized that while HPA gives great relief for synchronous and less CPU and memory consuming representational state transfer (REST) calls, Kubernetes is used in intensive CPU or memory long running workloads as well. There can be highly critical workloads that cannot afford to fail, e.g., consumption file processing for billing. This type of job will be executed in an interval, e.g., hourly or x times a day.

HPA has its own limitation with respect to the number of pods that can be spun which use only cluster-allocated resources, even though the bare metal (physical hardware) has more resources. If a job consumes more than the available CPU or memory in a cluster, a new pod cannot be initiated and will result in an out of memory exception. The same cluster may also be supporting the normal REST synchronous calls. Running high CPU-memory consuming and long running types of workloads may cause issues to the other REST application programming interfaces (APIs). Currently, the issue is addressed by allocating a large amount of resources to the cluster or by using multiple clusters (e.g., a failover cluster pattern). In both scenarios, the resources are blocked for the length of the job, which may happen only once in a day. In other words, the resources are under-utilized, as will now be further explained.

Kubernetes enables a multi-cluster environment by sharing and abstracting the underlying compute, network, and storage physical infrastructure, e.g., as illustrated and described above in the context of FIG. 2. One of the main features of Kubernetes in the networking side is the Kubernetes cluster. With shared compute/storage/network, the nodes are enabled and added to the Kubernetes cluster. The pod network allows identification of the pod across the network with PodIPs. With this cluster, a pod can run in any node and scale based on a replica set.

The number of pods needed to run for the cluster can be defined using the replica set. When the container loads, that many pods will be loaded for that service. More pods mean more resource allocation. The amount of memory and CPU the container can use for a cluster and a pod can also be defined. If the maximum resource consumption is reached, then the cluster will throw an out of resource exception. In this case, the cluster needs additional resources.

In an application, it is realized herein that there can be different types of services based on the loads. These loads are known as loads at the cluster level. The resource size can be set, for example, as follows:

(i) Regular execution (e.g., everyday operations such as events to process an order, an API to access customer data, data planning, data processing, etc.): This regular execution needs a set of resources not to impact regular business operation. The pods can scale accordingly. Normally, there is capacity planning for this type of execution, and the resources are fixed.

(ii) Seasonal execution (e.g., daily/weekly/monthly/yearly, such as a billing pipeline, a forecast load and season-based load such as holiday sales, etc.). Normally these seasonal loads need high compute power and resources, and at the same time, they should not impact regular execution operations and its resources.

However, in conventional Kubernetes orchestration platforms, any special/seasonal execution load needs to utilize the same set of fixed-allocation resources as the regular execution loads. Suppose regular services are running with considerable resource utilization and, at the same time, seasonal service requests come in. There is a possibility that the seasonal services will not get enough resources to execute or may over-utilize the regular services-allocated resources. Further, it is realized herein that subscribing and holding resources for seasonal/irregular loads is not a cost-effective resource utilization.

Figure 3:
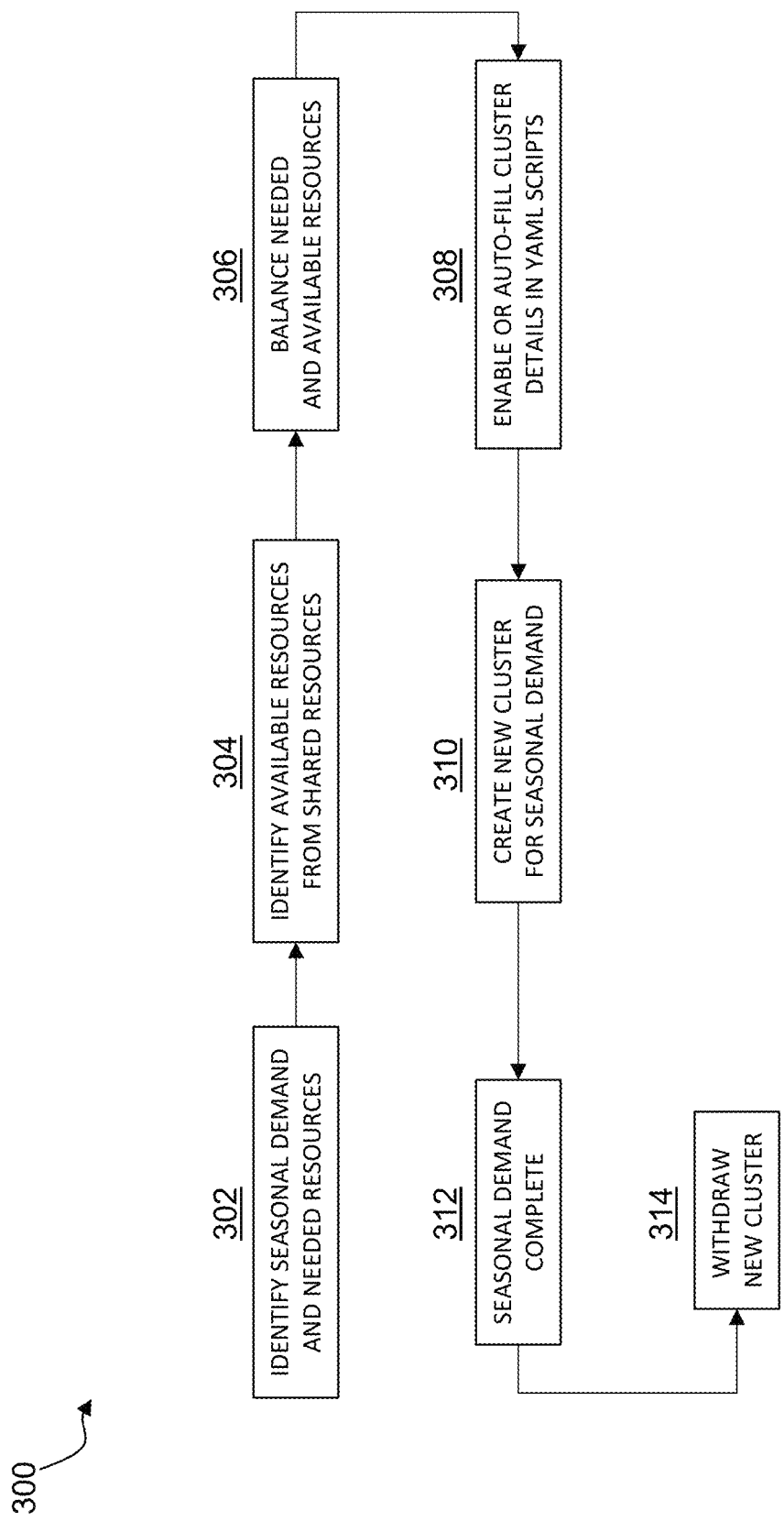
FIG. 3 illustrates a process for on-demand cluster management according to an illustrative embodiment.

Accordingly, illustrative embodiments realize that, for seasonal execution, large numbers of resources need not be allocated to a cluster permanently. Vendors charge for these resources. Rather, these seasonal high-demand resources can be demanded at run-time by intelligently assessing the cluster requirement for the seasonal execution, spinning a new cluster and, once execution is completed, freeing up the resources by withdrawing the temporary cluster. FIG. 3 generally illustrates this on-demand cluster management according to an illustrative embodiment. More particularly, process 300 in FIG. 3 comprises step 302 which identifies seasonal demands and needed resources (e.g., compute, storage, and network) for the seasonal demand. Step 304 identifies available resources from a set of shared resources. Step 306 balances needed and available resources. Step 308 enables cluster details (e.g., auto-fills cluster details in a yaml script in a Kubernetes implementation). Step 310 creates a new cluster for the seasonal demand. Step 312 determines once that the seasonal demand is complete. Step 314 withdraws (e.g., terminates, removes, etc.) the new cluster.

Accordingly, process 300 determines the range of resources required for an on-demand application/pods (seasonal execution) to run, how much time it needs to run, and knows how many resources are available in the shared resources in an existing cluster (regular execution) during that time. Process 300 then can decide that seasonal execution can be run in the existing cluster or it needs to create a new cluster with the knowledge of resources needed for the seasonal execution. It can be considered as creating a special task without disturbing the existing service (no impact) but leveraging the configuration (resources) of the existing cluster and, in parallel, building the new cluster. Hence, the special task is executed without impact. Once the special task is completed, then the cluster and its resources are withdrawn.

Figure 4:
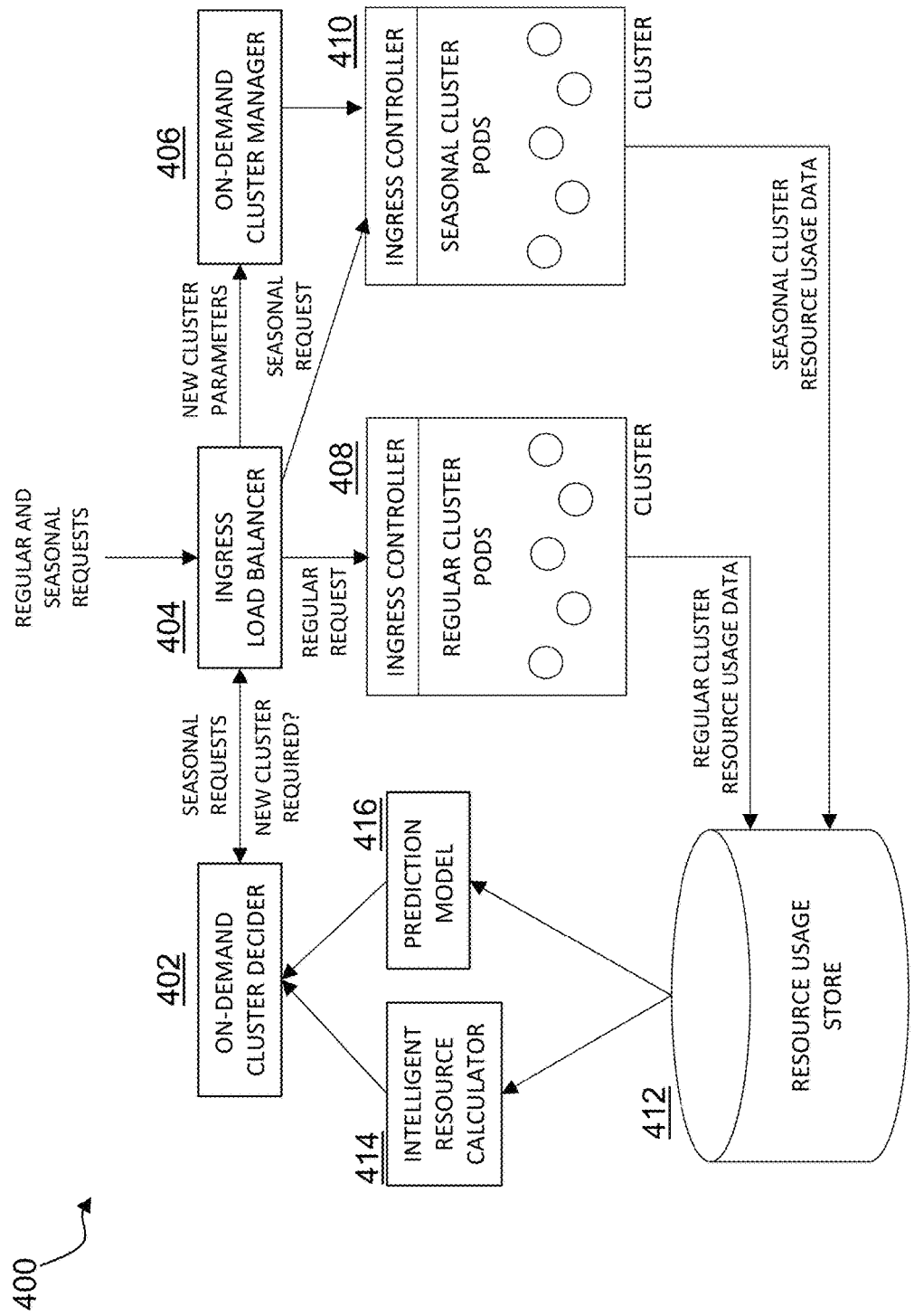
FIG. 4 illustrates a system architecture for on-demand cluster management according to an illustrative embodiment.

FIG. 4 illustrates a system architecture 400 for on-demand cluster management according to an illustrative embodiment. More particularly, system architecture 400 comprises a plurality of modules, illustratively interconnected as shown, that are configured to, inter alia, implement process 300. As shown, system architecture 400 comprises an on-demand cluster decider 402, an ingress load balancer 404, an on-demand cluster manager 406, a cluster 408 with an ingress controller and a plurality of regular cluster pods (also referred to herein as regular cluster 408), a cluster 410 with an ingress controller and a plurality of seasonal cluster pods (also referred to herein as a seasonal or on-demand cluster 410), a resource usage store 412, an intelligent resource calculator 414, and a prediction model 416 (also referred to herein as regular cluster resource prediction model 416).

As will be further described herein, intelligent resource calculator 414 identifies the need for on-demand clusters and resources required based on collected resource data from an initial run of a seasonal workload in a regular cluster. Prediction model 416 collects resource data against time for regular cluster 408, and predicts available resources for a regular cluster for a specified time. On-demand cluster decider 402 assists ingress load balancer 404 to decide the seasonal workload request needs to be passed to regular cluster 408 or on-demand cluster 410 based on the predicted available resources in regular cluster 408. On-demand cluster manager 406 sequences and loads scripts such as, for example, cluster configuration scripts and pod/service deployment for on-demand cluster 410 and removes on-demand cluster 410 once the seasonal execution is completed. On-demand cluster manager 406 also allows an administrator to classify on-demand attributes.

System architecture 400 operates in two modes: (i) a calibration mode as will be described below in the context of FIG. 5; and (ii) a run mode as will be described below in the context of FIG. 6. By way of example, system architecture 400 is scheduled to operate for a period of time (e.g., two weeks) in calibration mode to collect data and train prediction model 416, then change to run mode for on-demand cluster capability.

Figure 5:
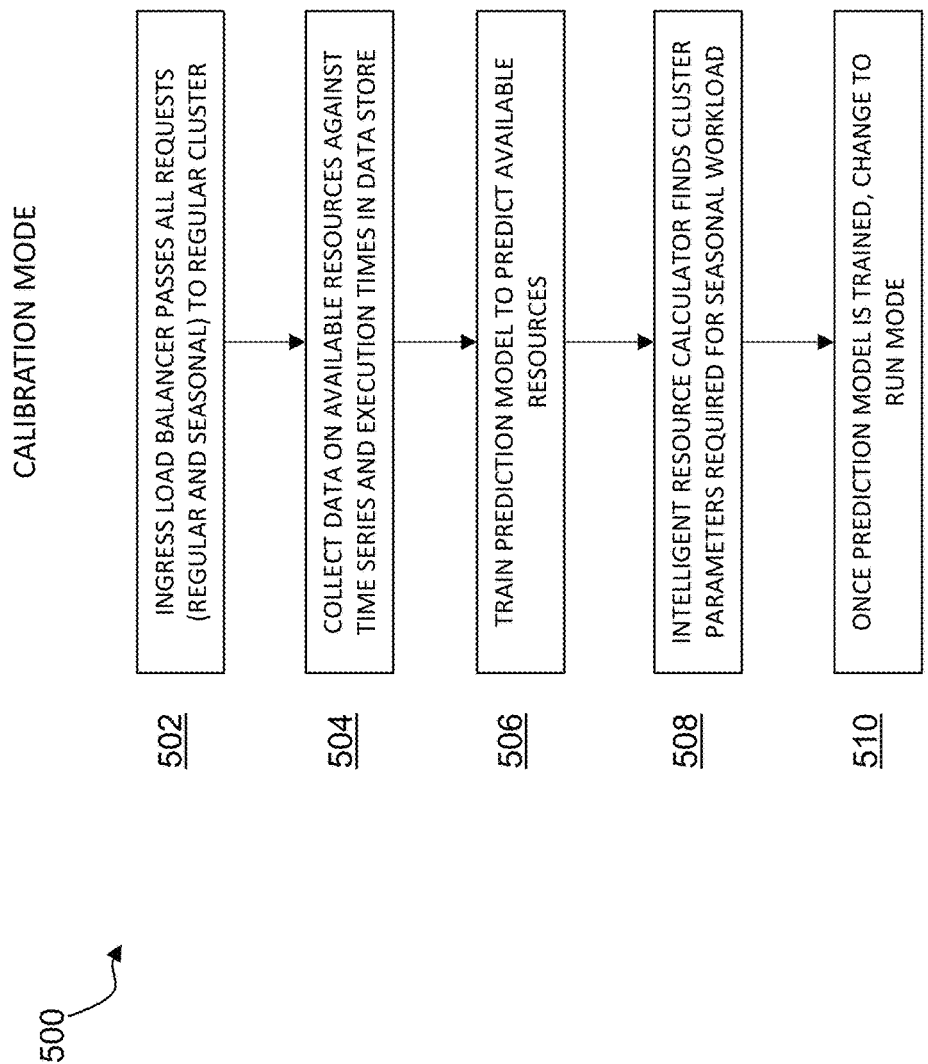
FIG. 5 illustrates a calibration mode process for on-demand cluster management according to an illustrative embodiment.

FIG. 5 illustrates a calibration mode process 500 according to an illustrative embodiment. As shown, in step 502, ingress load balancer 404 passes all requests (regular and seasonal) to regular cluster 408. In step 504, resource usage store 412 collects data indicative of the available resources against a given time series and execution time.

Step 506 trains prediction model 416 to predict the available resources. In step 508, intelligent resource calculator 414 finds the cluster parameters required for the seasonal workload. Once prediction model 416 is trained, step 510 changes system architecture 400 to the run mode.

Figure 6:
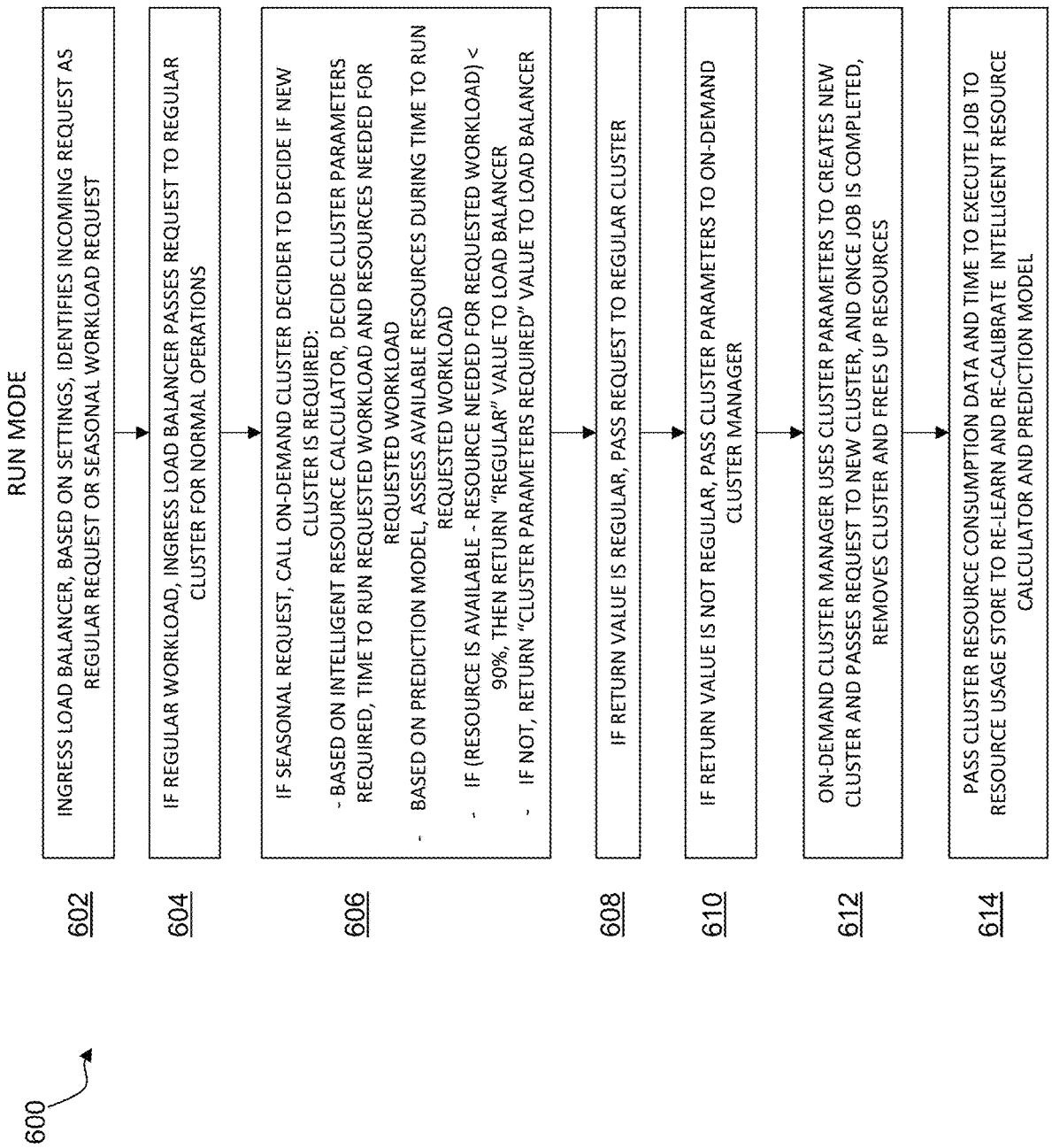
FIG. 6 illustrates a run mode process for on-demand cluster management according to an illustrative embodiment.

FIG. 6 illustrates a run mode process 600 according to an illustrative embodiment. As shown, in step 602, as workload requests come in, ingress load balancer 404 identifies, based on its settings, whether a request is a regular workload or a seasonal workload. In step 604, if the incoming request is a regular workload, ingress load balancer 404 passes it through to regular cluster 408 for normal operations.

In step 606, if the incoming request is a seasonal workload, then on-demand cluster decider 402 is called to decide if a new cluster is required. More particularly, on-demand cluster decider 402: (i) based on intelligent resource calculator 414, decides cluster parameters required, time to run the requested workload, and resources needed for the requested workload; (ii) based on regular cluster resource prediction model 416, assesses the available resources during the time to run the requested workload; (iii) determines if (resource is available−resource needed for requested workload)<90%, and when yes, then returns a "regular"

value to ingress load balancer 404; and (iv) if not, returns a "cluster parameters required" value to ingress load balancer 404.

In step 608, if a return value is received, ingress load balancer 404 passes the incoming request to regular cluster 408, and if cluster parameters required value is received (i.e., regular value is not received), ingress load balancer 404 passes the cluster parameters to on-demand cluster manager 406 in step 610.

In step 612, on-demand cluster manager 406 uses the cluster parameters to create a cluster and passes the job to the new cluster. Once, the job is executed (completed), on-demand cluster manager 406 removes the new cluster and frees up the resources.

In step 614, cluster resource consumption data and time to execute the job are passed to resource usage store 412 to re-learn and re-calibrate intelligent resource calculator 414 and prediction model 416.

Figure 7:
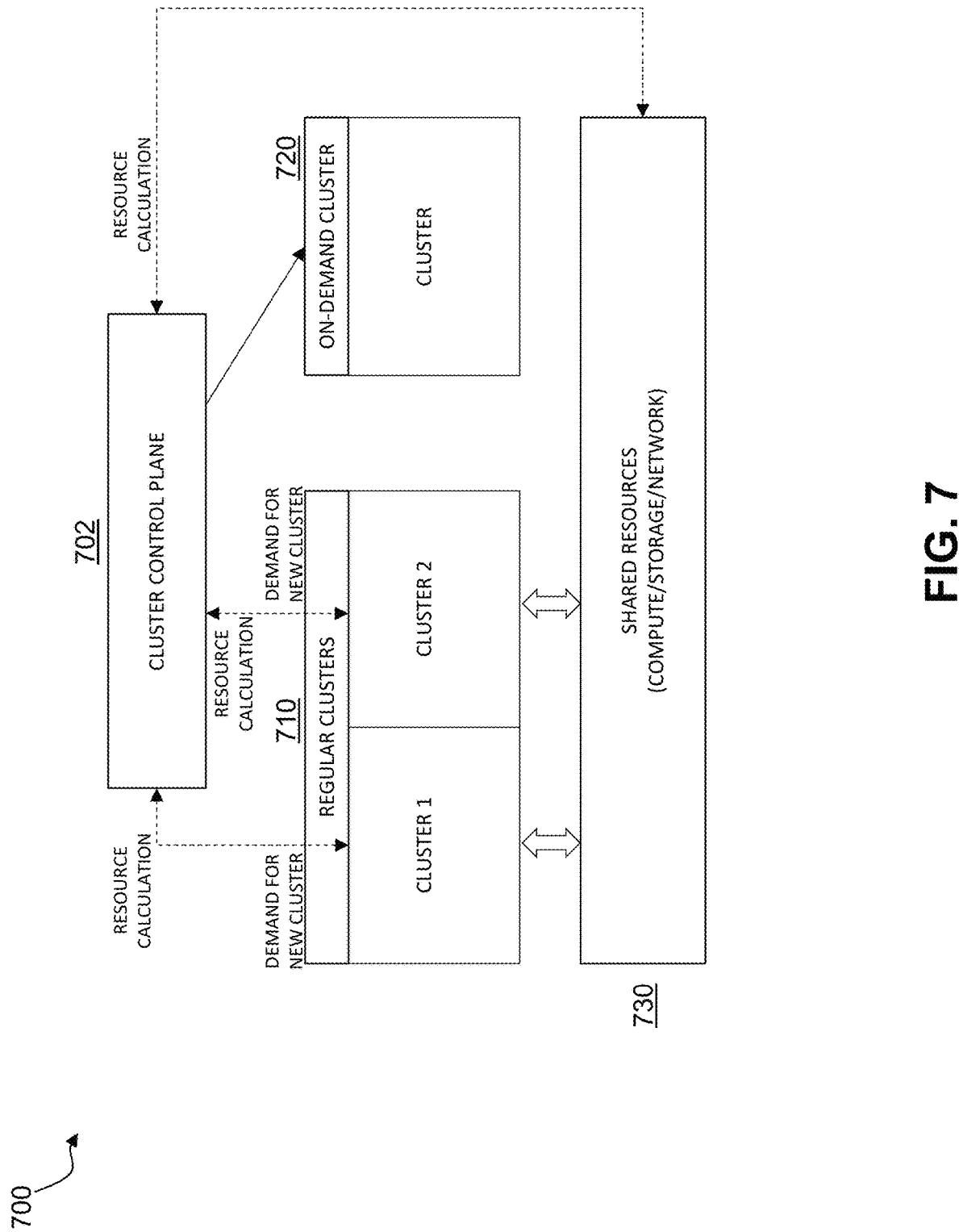
FIG. 7 illustrates an example of on-demand cluster management according to an illustrative embodiment.

FIG. 7 illustrates an example 700 of on-demand cluster management according to an illustrative embodiment. It is assumed that system architecture 400 (FIG. 4) executes calibration mode process 500 (FIG. 5) and run mode process 600 (FIG. 6) from a cluster control plane 702. As explained above, as requests come in, a determination is made as to whether a request should be executed in a regular cluster, i.e., one of cluster 1 or cluster 2 in regular clusters 710, or in a new cluster, i.e., on-demand cluster 720. Also as explained above, regular clusters 710 utilize shared resources 730, as does on-demand cluster 720 for a limited time until on-demand cluster 720 is withdrawn.

Further details of intelligent resource calculator 414 and how it determines, for each seasonal demand, what the resources are needed for execution, will now be explained in the context of FIGS. 8-11. It is realized herein that, in each information processing system environment, the resource availability will be different. So initially, intelligent resource calculator 414 identifies the required resources for regular service and calculates the threshold value in production for a predefined time (e.g., two weeks, a month). On-demand seasonal load also will be running in the same cluster. Intelligent resource calculator 414 identifies the resource requirements for the seasonal load.

Figure 8:
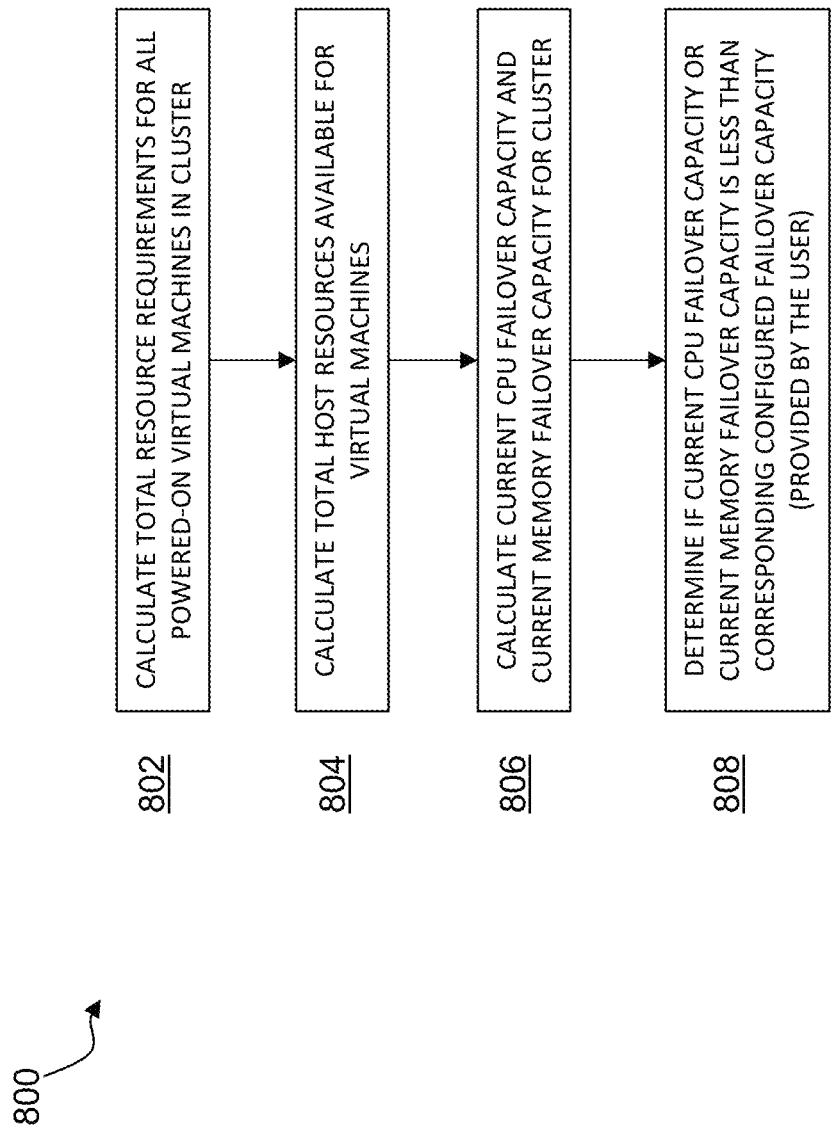
FIG. 8 illustrates an intelligent resource calculation process for on-demand cluster management according to an illustrative embodiment.
Figure 9:
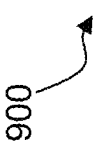
FIG. 9 illustrates collected cluster resource data for use by an intelligent resource calculator according to an illustrative embodiment.

FIG. 8 illustrates a process 800 implemented by intelligent resource calculator 414 according to an illustrative embodiment. As shown, step 802 calculates the total resource requirements for all powered-on virtual machines (VMs) in a given cluster. Step 804 calculates the total host resources available for the VMs. Step 806 calculates the current CPU failover capacity and current memory failover capacity for the cluster. Step 808 then determines if either the current CPU failover capacity or the current memory failover capacity is less than the corresponding configured failover capacity (e.g., provided by a user).

As the number of pods are increased in Kubernetes (a Kubernetes engine also adds pods when the request is more), more requests can be served. However, more pods means more resource consumption. The resources allocated cannot be extended based on the initial cluster setup. Also, it is worth keeping more resources to handle the seasonal load. Hence, it is useful to find the optimal resource situations with all other services running in the system. Thus, process 800 identifies the request and finds out the resource availability and resource needs, for example, the number of pods=3, CPU=900 m, memory=1102 mi, and limit=1. As shown in table 900 of FIG. 9, assume that there are seven Kubernetes clusters running in a primary cluster. Two clusters 3 and 7 reached the maximum capacity with allocated CPU 3500 m and 5000 m, respectively, and memory 12022 mi. There is no room for anymore pods here. If cluster 3 and 7 get some seasonal demands, it is challenging to execute the pod here. Hence, new cluster requests will be initiated for seasonal execution.

Figure 10:
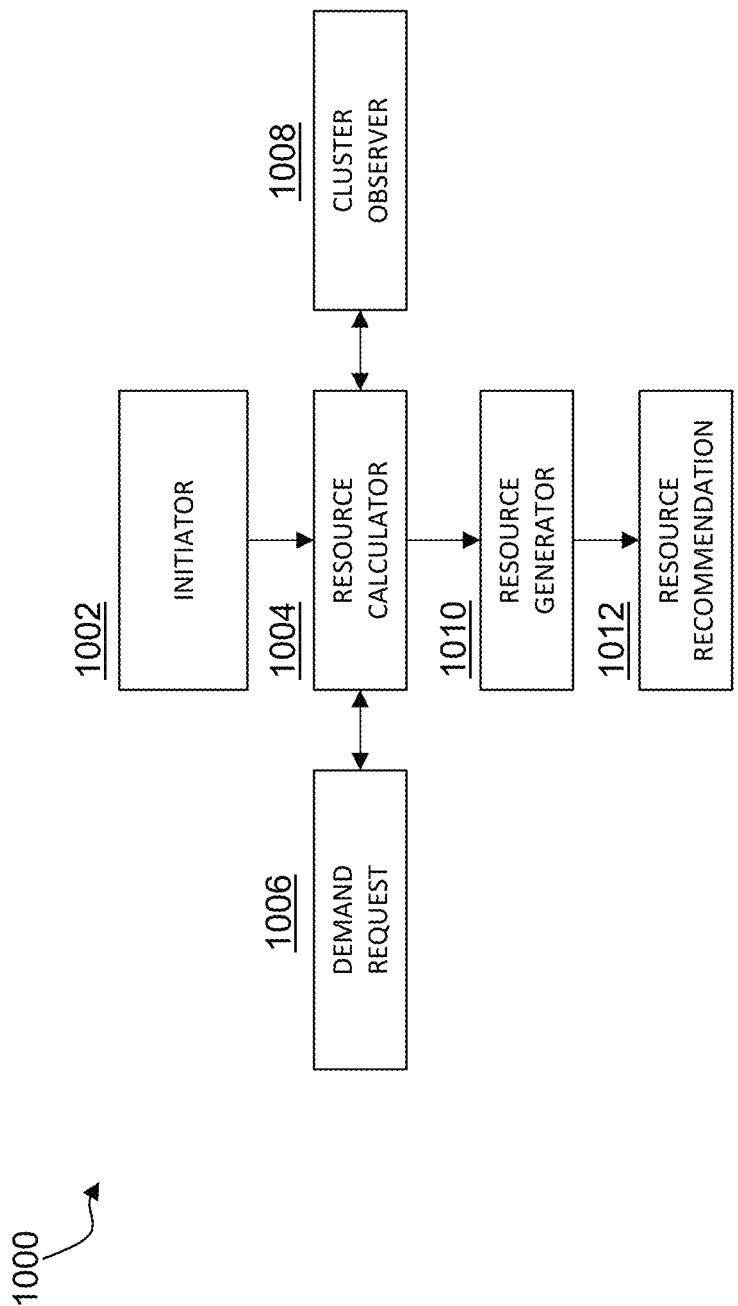
FIG. 10 illustrates an intelligent resource calculator for on-demand cluster management according to an illustrative embodiment.

FIG. 10 illustrates an exemplary architecture 1000 for intelligent resource calculator 414. As shown, exemplary architecture 1000 comprises an initiator 1002, a resource calculator 1004 which receives demand request 1006, cluster observer 1008, resource generator 1010, and resource recommendation 1012. Functionalities of these modules are apparent from the explanations herein, while cluster observer 1008 monitors and calculates the infrastructure-as-a-service (IAAS) cluster load and individual Kubernetes cluster. The resource calculator 1004 reconciles the input of cluster observer 1008 and incoming demand request 1006. An example of resource recommendation 1012 is cluster information 1100 for clusters 8 and 9 in FIG. 11.

Further details of on-demand cluster manager 406 will now be explained in the context of FIGS. 12A-12E. Once intelligent resource calculator 414 provides the recommendation, telemetry is sent to a cluster deployment control plane (e.g., cluster control plane 702). The cluster deployment control plane executes cluster commands to set up a Kubernetes cluster and creates a disposable environment by making use of configuration files. The, as shown, command code 1200 in FIG. 12A installs kubelet and kubeadm components. Command code 1210 in FIG. 12B initializes the Kubernetes cluster with kubeadm. Command code 1220 in FIG. 12C sets up the Kube config. Command code 1230 in FIG. 12D sets up the container networking provider. Command code 1240 in FIG. 12E generates Kube join command for joining the node to the Kubernetes cluster. Then, a handler is set up, the pods are run, the seasonal workload is run, and once completed, the cluster is removed.

Figure 13:
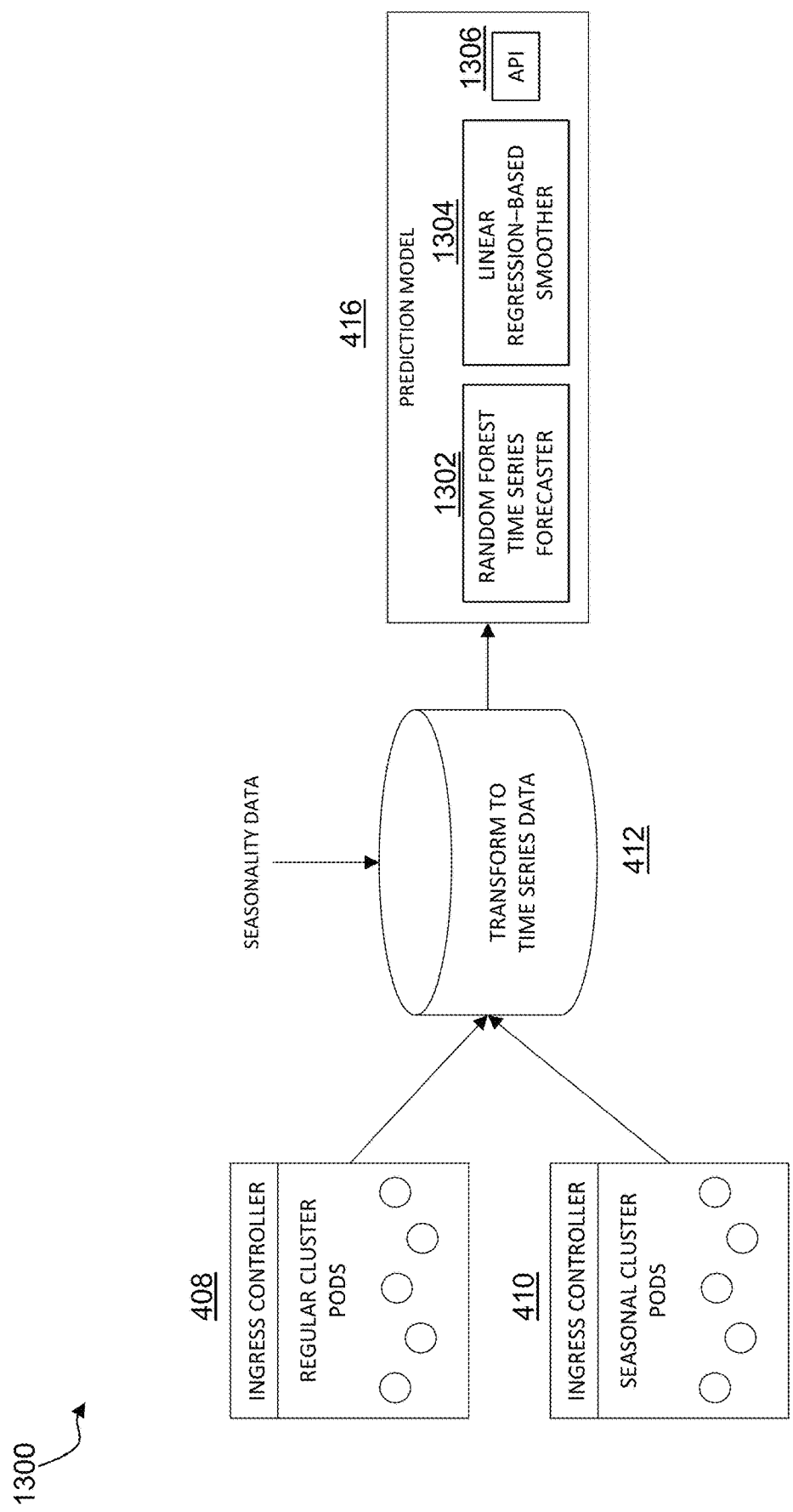
FIG. 13 illustrates a prediction model for on-demand cluster management according to an illustrative embodiment.

Further details of prediction model 416 will now be explained in the context of system architecture 1300 in FIG. 13. Recall from FIG. 4 and as now depicted in FIG. 13, regular cluster 408, on-demand cluster 410, resource usage store 412, and prediction model 416. As shown in FIG. 13, prediction model 416 comprises a random forest time series forecaster 1302, a linear regression-based smoother 1304, and an API 1306. Prediction model 416 takes the history of the available resources and execution time (time duration) of different workloads in a cluster (transformed to time series data by resource usage store 412), and generates a predicted value indicating the predicted resource availability using machine learning algorithms comprising random forest time series forecaster 1302 and a linear regression-based smoother 1304. API 1306 is used to communicate inputs and outputs to the machine learning algorithms.

Advantageously, illustrative embodiments provide useful segregation of on-demand clusters in a Kubernetes platform. Illustrative embodiments also provide machine learning-based resource calculation and recommendation for on-demand clusters for seasonal/unusual load. Furthermore, illustrative embodiments provide a cluster control plane concept in the Kubernetes cluster to receive instruction and configuration to manage the resource and allocate the resources.

Figure 14:
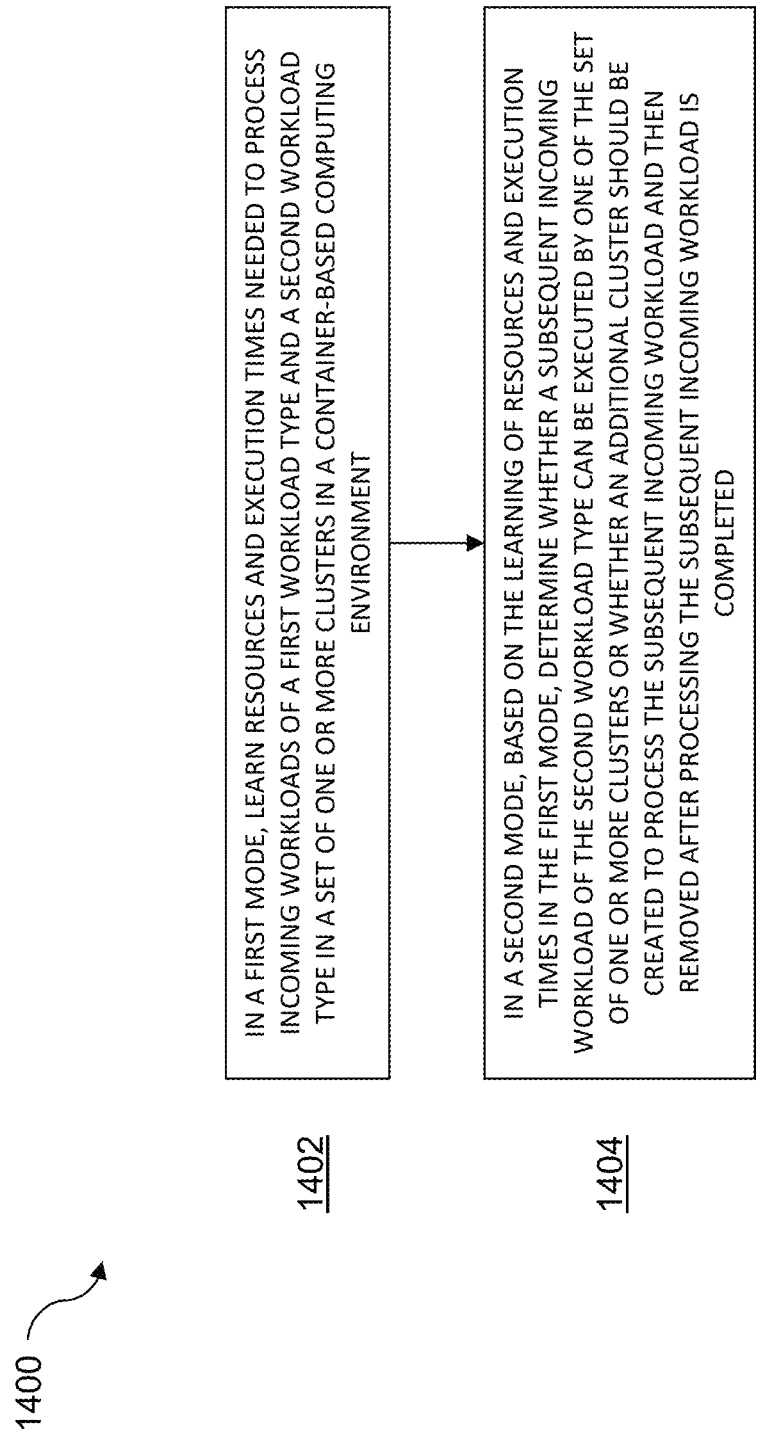
FIG. 14 illustrates a methodology for on-demand cluster management according to an illustrative embodiment.

FIG. 14 illustrates a methodology 1400 for on-demand cluster management according to an illustrative embodiment. As shown, in a first mode, step 1402 learns resources and execution times needed to process incoming workloads of a first workload type and a second workload type in a set of one or more clusters in a container-based computing environment. In a second mode, based on the learning of resources and execution times in the first mode, step 1404 determines whether a subsequent incoming workload of the second workload type can be executed by one of the set of one or more clusters or whether an additional cluster should be created to process the subsequent incoming workload and then removed after processing the subsequent incoming workload is completed.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for on-demand cluster management in container environments will now be described in greater detail with reference to FIGS. 15 and 16. It is to be appreciated that systems and processes described in the context of FIGS. 1-14 can be performed via the platforms in FIGS. 15 and/or 16 but may also be implemented, in whole or in part, in other information processing systems in other embodiments.

Figure 15:
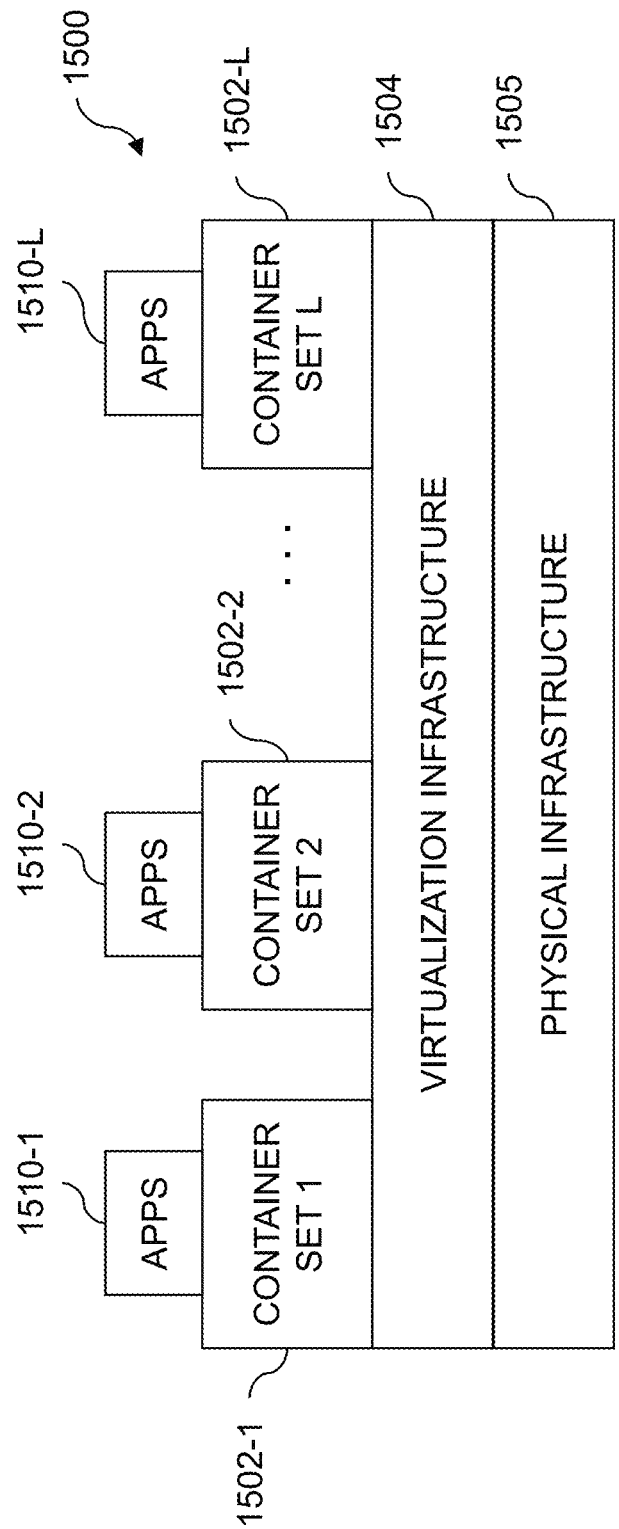
FIGS. 15 and 16 respectively illustrate examples of processing platforms that may be utilized to implement at least a portion of an information processing system with a pod-based container environment according to one or more illustrative embodiments.
Figure 16:
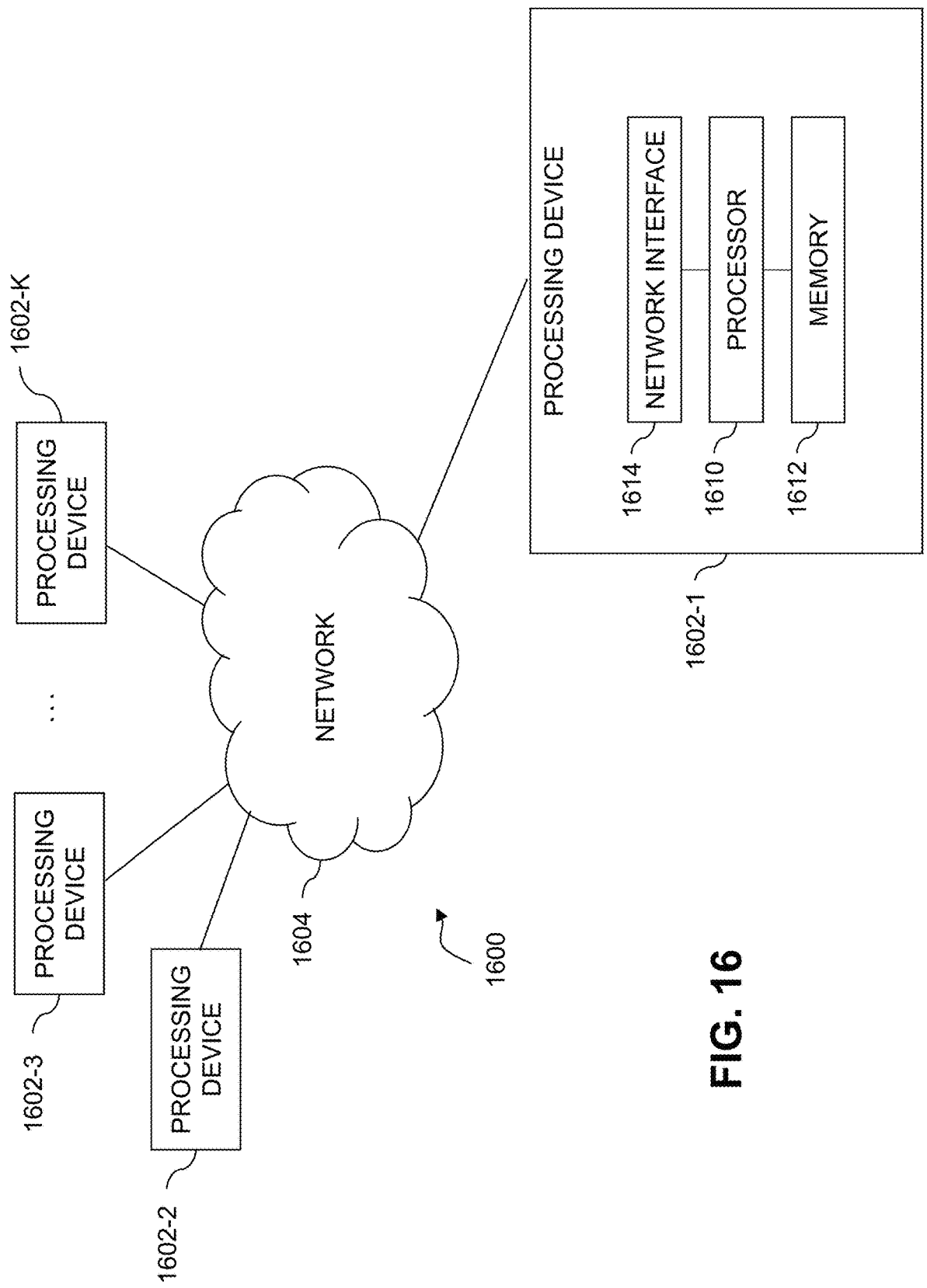

FIG. 15 shows an example processing platform comprising cloud infrastructure 1500. The cloud infrastructure 1500 comprises a combination of physical and virtual processing resources that may be utilized to implement at least a portion of the information processing systems described herein. The cloud infrastructure 1500 comprises multiple container sets 1502-1, 1502-2, . . . 1502-L implemented using virtualization infrastructure 1504. The virtualization infrastructure 1504 runs on physical infrastructure 1505, and illustratively comprises one or more hypervisors and/or operating system level virtualization infrastructure.

The cloud infrastructure 1500 further comprises sets of applications 1510-1, 1510-2, . . . 1510-L running on respective ones of the container sets 1502-1, 1502-2, . . . 1502-L under the control of the virtualization infrastructure 1504. The container sets 1502 may comprise respective sets of one or more containers.

In some implementations of the FIG. 15 embodiment, the container sets 1502 comprise respective containers implemented using virtualization infrastructure 1504 that provides operating system level virtualization functionality, such as support for Kubernetes-managed containers.

As is apparent from the above, one or more of the processing modules or other components of system 100/200 may each run on a computer, server, storage device or other processing platform element. A given such element may be viewed as an example of what is more generally referred to herein as a "processing device." The cloud infrastructure 1500 shown in FIG. 15 may represent at least a portion of one processing platform. Another example of such a processing platform is processing platform 1600 shown in FIG. 16.

The processing platform 1600 in this embodiment comprises a portion of system 100/200 and includes a plurality of processing devices, denoted 1602-1, 1602-2, 1602-3, . . . 1602-K, which communicate with one another over a network 1604.

The network 1604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1602-1 in the processing platform 1600 comprises a processor 1610 coupled to a memory 1612.

The processor 1610 may comprise a microprocessor, a microcontroller, an application-specific integrated circuit (ASIC), a field-programmable gate array (FPGA) or other type of processing circuitry, as well as portions or combinations of such circuitry elements.

The memory 1612 may comprise random access memory (RAM), read-only memory (ROM), flash memory or other types of memory, in any combination. The memory 1612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1602-1 is network interface circuitry 1614, which is used to interface the processing device with the network 1604 and other system components, and may comprise conventional transceivers.

The other processing devices 1602 of the processing platform 1600 are assumed to be configured in a manner similar to that shown for processing device 1602-1 in the figure.

Again, the particular processing platform 1600 shown in the figure is presented by way of example only, and systems 100/200 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality as disclosed herein are illustratively implemented in the form of software running on one or more processing devices.

In some embodiments, storage systems may comprise at least one storage array implemented as a Unity™, PowerMax™, PowerFlex™ (previously ScaleIO™) or PowerStore™ storage array, commercially available from Dell Technologies. As another example, storage arrays may comprise respective clustered storage systems, each including a plurality of storage nodes interconnected by one or more networks. An example of a clustered storage system of this type is an XtremIO™ storage array from Dell Technologies, illustratively implemented in the form of a scale-out all-flash content addressable storage array.

The particular processing operations and other system functionality described in conjunction with the diagrams described herein are presented by way of illustrative example only, and should not be construed as limiting the scope of the disclosure in any way. Alternative embodiments can use other types of processing operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments are presented for purposes of illustration only. Many variations and other alternative embodiments may be used. For example, the disclosed techniques are applicable to a wide variety of other types of information processing systems, host devices, storage systems, container monitoring tools, container management or orchestration systems, container metrics, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising at least one processing platform, the processing platform comprising at least one processor coupled to at least one memory, the at least one processing platform, when executing program code, is configured to:
   in a first mode, learn resources and execution times needed to process incoming workloads of a first workload type and a second workload type in a set of one or more clusters in a container-based computing environment; and
   in a second mode, based on the learning of resources and execution times in the first mode, determine whether a subsequent incoming workload of the second workload type can be executed by one of the set of one or more clusters or whether an additional cluster should be created to process the subsequent incoming workload and then removed after processing the subsequent incoming workload is completed.

2. The apparatus of claim 1, wherein the first workload type is a regular execution workload and the second workload type is a seasonal execution workload.

3. The apparatus of claim 1, wherein, in the first mode, the at least one processing platform is further configured to collect resource consumption data for resources used to process the incoming workloads of the first workload type and the second workload type in the set of one or more clusters.

4. The apparatus of claim 3, wherein, in the first mode, the at least one processing platform is further configured to find one or more cluster parameters for incoming workloads of the second workload type.

5. The apparatus of claim 1, wherein, in the second mode, the at least one processing platform is further configured to calculate resources needed to process the subsequent incoming workload of the second workload type.

6. The apparatus of claim 5, wherein, in the second mode, the at least one processing platform is further configured to assess resources available to the set of one or more clusters for a given execution time learned during the first mode.

7. The apparatus of claim 6, wherein, in the second mode, the at least one processing platform is further configured to, when the difference between the resources available and the resources needed is below a given threshold, process the subsequent incoming workload of the second workload type in one of the set of one or more clusters.

8. The apparatus of claim 7, wherein, in the second mode, the at least one processing platform is further configured to, when the difference between the resources available and the resources needed is at or above the given threshold, create the additional cluster, process the subsequent incoming workload in the additional cluster, and remove the additional cluster after processing the subsequent incoming workload.

9. The apparatus of claim 8, wherein, in the second mode, the at least one processing platform is further configured to collect resource consumption data for resources used to process the subsequent incoming workload of the second workload type in the additional cluster.

10. The apparatus of claim 1, wherein, in the first mode, the at least one processing platform is further configured to train a prediction model to learn the resources and the execution times needed to process incoming workloads of the first workload type and the second workload type in the set of one or more clusters.

11. The apparatus of claim 1, wherein the at least one processing platform is further configured to calculate resource availability based on a resource failover capacity.

12. The apparatus of claim 1, wherein at least one of the first mode and the second mode utilize one or more machine learning algorithms.

13. A method comprising:
   in a first mode, learning resources and execution times needed to process incoming workloads of a first workload type and a second workload type in a set of one or more clusters in a container-based computing environment; and
   in a second mode, based on the learning of resources and execution times in the first mode, determining whether a subsequent incoming workload of the second workload type can be executed by one of the set of one or more clusters or whether an additional cluster should be created to process the subsequent incoming workload and then removed after processing the subsequent incoming workload is completed;
   wherein the steps are implemented by at least one processing platform comprising at least one processor coupled to at least one memory configured to execute program code.

14. The method of claim 13, wherein the first workload type is a regular execution workload and the second workload type is a seasonal execution workload.

15. The method of claim 13, further comprising, in the first mode, collecting resource consumption data for resources used to process the incoming workloads of the first workload type and the second workload type in the set of one or more clusters.

16. The method of claim 15, further comprising, in the first mode, finding one or more cluster parameters for incoming workloads of the second workload type.

17. The method of claim 13, further comprising, in the second mode:
   calculating resources needed to process the subsequent incoming workload of the second workload type;

assessing resources available to the set of one or more clusters for a given execution time learned during the first mode;

when the difference between the resources available and the resources needed is below a given threshold, processing the subsequent incoming workload of the second workload type in one of the set of one or more clusters; and when the difference between the resources available and the resources needed is at or above the given threshold, creating the additional cluster, processing the subsequent incoming workload in the additional cluster, and removing the additional cluster after processing the subsequent incoming workload.

18. The method of claim 17, further comprising, in the second mode, collecting resource consumption data for resources used to process the subsequent incoming workload of the second workload type in the additional cluster.

19. A computer program product comprising a non-transitory processor-readable storage medium having stored therein program code of one or more software programs, wherein the program code when executed by at least one processing platform causes the at least one processing platform to:

in a first mode, learn resources and execution times needed to process incoming workloads of a first workload type and a second workload type in a set of one or more clusters in a container-based computing environment; and in a second mode, based on the learning of resources and execution times in the first mode, determine whether a subsequent incoming workload of the second workload type can be executed by one of the set of one or more clusters or whether an additional cluster should be created to process the subsequent incoming workload and then removed after processing the subsequent incoming workload is completed.

20. The computer program product of claim 19, wherein the first workload type is a regular execution workload and the second workload type is a seasonal execution workload.

* * * * *